US010894511B2

(12) United States Patent
Chen et al.

(10) Patent No.: US 10,894,511 B2
(45) Date of Patent: Jan. 19, 2021

(54) VEHICLE WINDOW ASSEMBLY HAVING A LIGHT-PRODUCING ASSEMBLY

(71) Applicant: Ford Global Technologies, LLC, Dearborn, MI (US)

(72) Inventors: Linsheng Chen, Novi, MI (US); Stuart C. Salter, White Lake, MI (US); Steven J. Antilla, Brighton, MI (US); Tom Xu, Nanjing (CN); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/906,458

(22) Filed: Feb. 27, 2018

(65) Prior Publication Data

US 2019/0263319 A1    Aug. 29, 2019

(51) Int. Cl.
| | | |
|---|---|---|
| *B60Q 3/74* | (2017.01) | |
| *G02F 1/1334* | (2006.01) | |
| *B60Q 3/208* | (2017.01) | |
| *G02F 1/1333* | (2006.01) | |
| *B60Q 3/82* | (2017.01) | |
| *G02F 1/137* | (2006.01) | |
| *B60Q 3/60* | (2017.01) | |

(52) U.S. Cl.
CPC .............. *B60Q 3/74* (2017.02); *B60Q 3/208* (2017.02); *B60Q 3/60* (2017.02); *B60Q 3/82* (2017.02); *G02F 1/137* (2013.01); *G02F 1/1334* (2013.01); *G02F 1/13338* (2013.01)

(58) Field of Classification Search
CPC combination set(s) only.
See application file for complete search history.

(56) References Cited

U.S. PATENT DOCUMENTS

| | | | |
|---|---|---|---|
| 8,547,017 B2 | 10/2013 | Salter et al. | |
| 9,694,740 B2 | 7/2017 | Frey et al. | |
| 2009/0015736 A1* | 1/2009 | Weller | B60R 1/12 349/11 |
| 2009/0251917 A1 | 10/2009 | Wollner et al. | |
| 2010/0238677 A1 | 9/2010 | de Laine et al. | |
| 2011/0292318 A1* | 12/2011 | Nakamoto | G02B 6/0016 349/62 |
| 2015/0151675 A1 | 6/2015 | Lefevre et al. | |
| 2015/0253487 A1* | 9/2015 | Nichol | G02B 6/0036 362/610 |
| 2016/0052446 A1* | 2/2016 | Frey | G02F 1/1334 349/16 |
| 2016/0185284 A1* | 6/2016 | Salter | B60R 13/005 362/510 |

FOREIGN PATENT DOCUMENTS

WO    2017135182 A1    8/2017

* cited by examiner

*Primary Examiner* — Lauren Nguyen
(74) *Attorney, Agent, or Firm* — David Coppiellie; Price Heneveld LLP

(57) ABSTRACT

A vehicle window assembly is provided herein and includes an inner layer, an outer layer, and an interlayer therebetween. A light-producing assembly is disposed in the interlayer and includes light sources disposed to emit light toward the inner layer, an optical film configured to collimate light emitted by the light sources, and a variable-transparency switchable glazing configured to vary the transmittance of the light emitted from the light sources based on user-supplied input.

15 Claims, 4 Drawing Sheets

VEHICLE WINDOW ASSEMBLY HAVING A LIGHT-PRODUCING ASSEMBLY

FIELD OF THE INVENTION

The present invention generally relates to vehicle lighting assemblies, and more particularly, to a vehicle window assembly operable as a map light and a dome light.

BACKGROUND OF THE INVENTION

Vehicles commonly provide map and dome light features in overhead consoles. However, doing so takes up space and may result in a cluttered appearance. The present disclosure is intended to address this problem by providing a vehicle window assembly capable of operating as a map light and dome light. In so doing, space savings can be realized while providing an attractive lighting experience.

SUMMARY OF THE INVENTION

According to a first aspect of the present invention, a vehicle window assembly is provided and includes an inner layer, an outer layer, and an interlayer therebetween. A light-producing assembly is disposed in the interlayer and includes light sources disposed to emit light toward the inner layer, an optical film configured to collimate light emitted by the light sources, and a variable-transparency switchable glazing configured to vary the transmittance of the light emitted from the light sources based on user-supplied input.

Embodiments of the first aspect of the invention can include any one or a combination of the following features:
  the interlayer includes a first tinted layer coupled to the inner layer and a second tinted layer coupled to the outer layer, and the light-producing assembly is disposed between the first and second tinted layers;
  the light sources include micro light-emitting diodes;
  the optical film includes a collimating film or a light refractive microstructure film and is in contact with or is spaced apart from the light sources;
  the variable-transparency switchable glazing includes a polymer dispersed liquid crystal device and is in contact with or is spaced apart from the optical film;
  based on the user-supplied input, the variable-transparency switchable glazing is operated to transmit or scatter collimated light received from the optical film;
  the light-producing assembly functions as a map light when the variable-transparency switchable glazing is operated to transmit collimated light and a dome light when the variable-transparency switchable glazing is operated to scatter collimated light;
  further including a proximity sensor coupled to the inner layer and disposed to align with the light producing assembly from the vantage point of a vehicle occupant positioned therebelow;
  the user-supplied input includes one or more touch events registered by the capacitive sensor;
  further including a controller coupled to the capacitive sensor, the light sources, and the variable-transparency switchable glazing, wherein the controller includes instructions for controlling the light sources and the variable-transparency switchable glazing based on the user-supplied input received via the capacitive sensor; and
  the vehicle window assembly is configured as a sunroof or a moonroof.

According to a second aspect of the present invention, a vehicle window assembly is provided and includes an inner layer, an outer layer, and an interlayer therebetween. A light-producing assembly is disposed in the interlayer and includes light sources disposed to emit light toward the inner layer, an optical film coupled to the light sources and configured to collimate light emitted thereby, and a polymer dispersed liquid crystal device coupled to the optical film and including a number of liquid crystal droplets within a film disposed between two layers of a transparent and conductive material. Based on user-supplied input, the polymer dispersed liquid crystal device is operated to transmit or scatter collimated light received from the optical film.

Embodiments of the second aspect of the invention can include any one or a combination of the following features:
  further including a proximity sensor coupled to the inner layer and disposed to align with the light producing assembly from the vantage point of a vehicle occupant positioned therebelow;
  the user-supplied input includes one or more touch events registered by the capacitive sensor;
  a touch event on the proximity sensor results in voltage being applied to the material such that the liquid crystal droplets become aligned in order to transmit collimated light received from the optical film with minimal scattering; and
  a touch event on the proximity sensor results in no voltage being applied to the material such that liquid crystal droplets scatter collimated light received from the optical film.

According to a third aspect of the present invention, a vehicle window assembly is provided. A vehicle window has a plurality of zones configured to provide illumination to a vehicle cabin. A light-producing assembly and a proximity sensor are integrated with the vehicle window and are located in each zone. The light-producing assembly is operable to illuminate as a map light or a dome light based on one or more touch events registered by the proximity sensor.

Embodiments of the third aspect of the invention can include any one or a combination of the following features:
  the light-producing assembly is disposed in an interlayer of the vehicle window and includes light sources configured to emit light toward the vehicle cabin, an optical film configured to collimate light emitted by the light sources, and a variable-transparency switchable glazing configured to transmit or scatter collimated light received from the optical film;
  a first touch event results in the variable-transparency switchable glazing operating to one of transmit and scatter collimated light received from the optical film, and a second touch event results in the variable-transparency switchable glazing operating to the other of transmit and scatter collimated light received from the optical film; and
  a third touch event results in deactivation of the light-producing assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
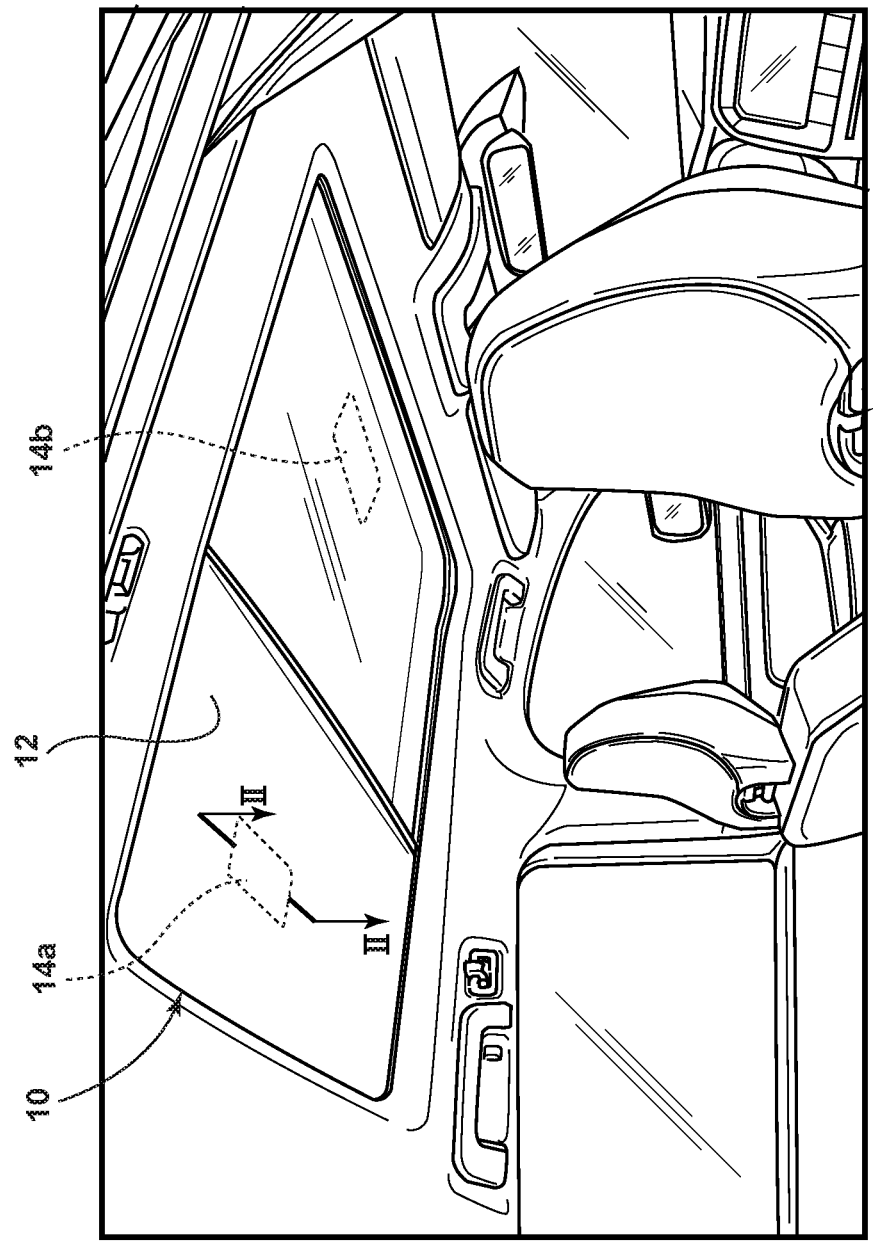
FIG. 1 is a perspective view of a vehicle window assembly including a vehicle window exemplarily shown as a sunroof.

Referring to FIG. 1, a vehicle window assembly 10 is shown. The assembly 10 includes a vehicle window 12 exemplarily depicted as a sunroof. As shown, the vehicle window 12 has a number of zones generally depicted as zones 14a and 14b. The zones 14a, 14b are typically located above occupant seating areas and are configured to provide illumination to vehicle occupants. As will be described herein, each zone 14a, 14b is selectively operable to function as a map light or a dome light based on user-supplied input. In other words, it is contemplated that each zone 14a, 14b may be operated to provide task lighting or general ambient lighting.

Accordingly, a vehicle manufacturer employing the assembly 10 described herein may forego conventional map and/or dome lights in favor of a number of zones strategically located on a sunroof or other vehicle window to provide the same amenities. This not only imparts a cleaner look, but also delivers a unique and attractive lighting experience when one or more zones become illuminated.

Figure 2:
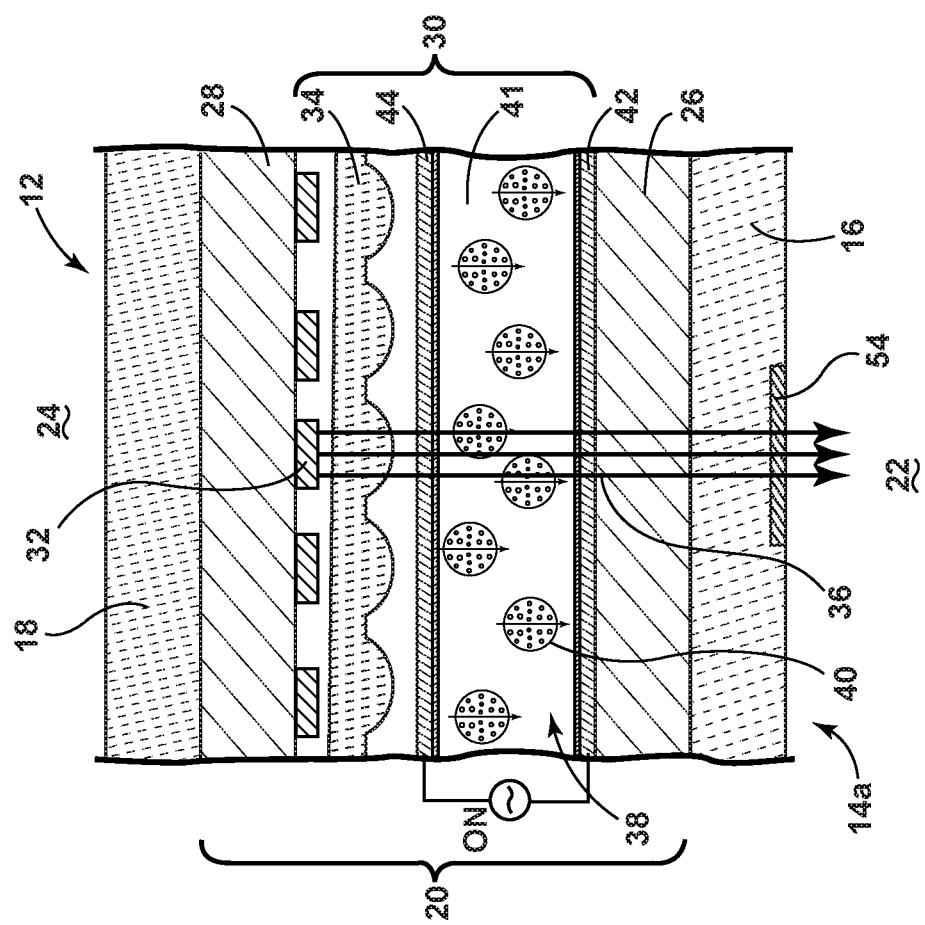
FIG. 2 is a cross-sectional view of a vehicle window taken along line II-II of FIG. 1, the vehicle window operating as a map light.
Figure 3:
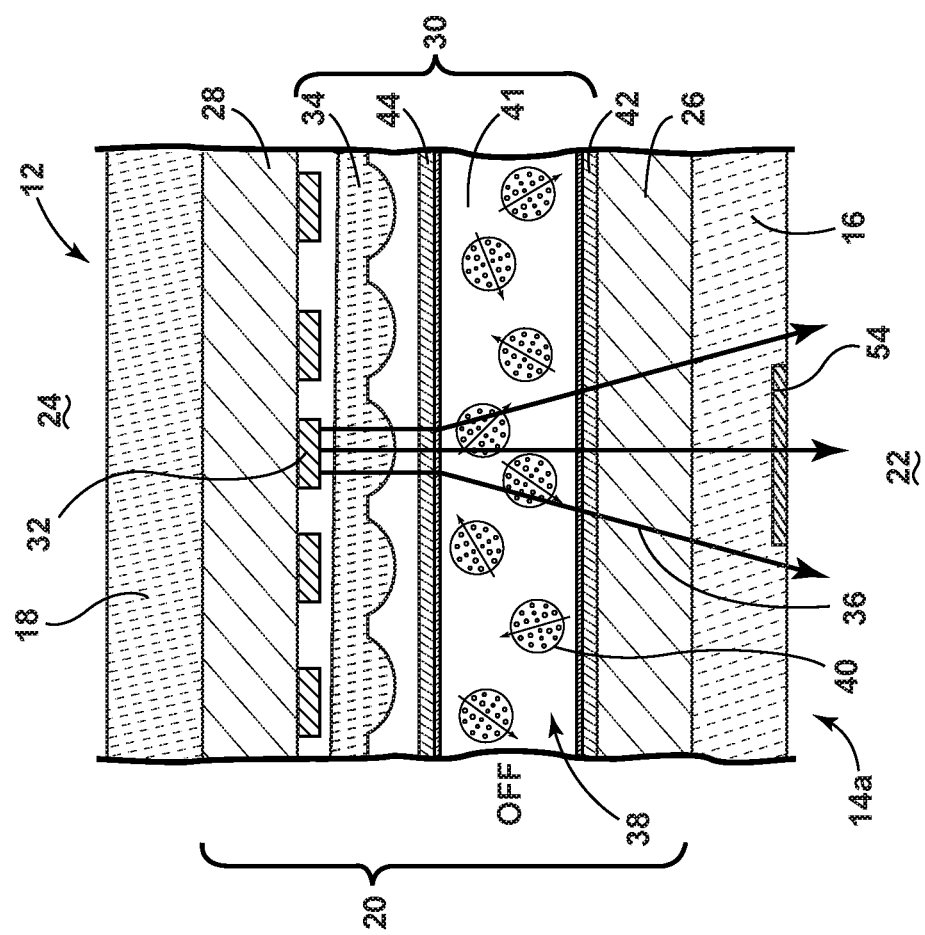
FIG. 3 illustrates the vehicle window of FIG. 2 operating as a dome light.

Referring to FIGS. 2 and 3, a portion of the vehicle window 12 including zone 14a is shown in greater detail. It will be understood that any additional zones, including zone 14b, may be similarly configured. As depicted, the vehicle window 12 includes an inner layer 16, an outer layer 18, and an interlayer 20 disposed therebetween. The inner layer 16 is in communication with a vehicle cabin 22 that includes occupant seating areas, and the outer layer 18 is in communication with an outside vehicle environment 24. The inner and outer layers 16, 18 may be constructed from glass or any other material suitable for vehicle window construction. While the vehicle window 12 is generally represented as a planar structure, it will be appreciated that the vehicle window 12 and associated components may be curved if desired.

The interlayer 20 may be constructed from a plastic material such as, but not limited to, polyvinyl butyral (PVB) and includes a first tinted layer 26 coupled to the inner layer 16, and a second tinted layer 28 coupled to the outer layer 18. Both the first and second tinted layers 26, 28 may include a PVB film selected based on desired optical clarity, adhesion, resilience, flexibility, and/or other factors. The interlayer 20 further includes a light-producing assembly 30 embedded therein and disposed between the first and second tinted layers 26, 28 and configured to generate and direct light toward the inner layer 16. The light is transmitted through the inner layer 16 and serves to provide task lighting or general ambient lighting to the vehicle cabin 22.

In the depicted embodiment, the light-producing assembly 30 includes a number of light sources 32 proximate the second tinted layer 28. The light sources 32 are disposed to emit light toward the inner layer 16 and may include micro light-emitting diodes (LEDs) embedded in the interlayer 20. An optical film 34 such as a collimating film or light refractive micro structure film (LRMSF) is coupled to the light sources 32 and is configured to receive and concentrate light emitted thereby. For example, as shown in FIGS. 2 and 3, light emitted by the light sources 32 is generally represented by arrows 36. As shown, the light emitted by the light sources 32 is collimated by the optical film 34 and is transmitted toward the inner layer 16. It is contemplated that the optical film 34 may include a prism, micro lens, pyramid, or hemi-cylinder geometry. Also, additional optical films may be coupled to the optical film in a stack to further concentrate light emitted by the light sources. It is also contemplated that the optical film 34 may be in contact with or be spaced apart from the light sources 32.

A variable-transparency switchable glazing 38 is coupled to the optical film 34 and is configured to vary the transmittance of the light emitted from the light sources 32. In the depicted embodiment, the glazing 38 may be in contact with or be spaced apart from the optical film 34. The glazing 38 may correspond to a polymer dispersed liquid crystal (PDLC) device having a number of liquid crystal droplets 40 dissolved or dispersed along a film 41. The size of the particular droplets 40 may be varied based on a solidification or curing process of the polymer. Additionally, the droplets 40 may be randomly positioned in the film 41. As shown, the droplets 40 generally span longitudinally across the film 41 and may be provided at different heights therein. The film 41 is disposed between two layers of a transparent and conductive material 42, 44, which in turn may draw electrical power from a vehicle power source (not shown).

Figure 4:
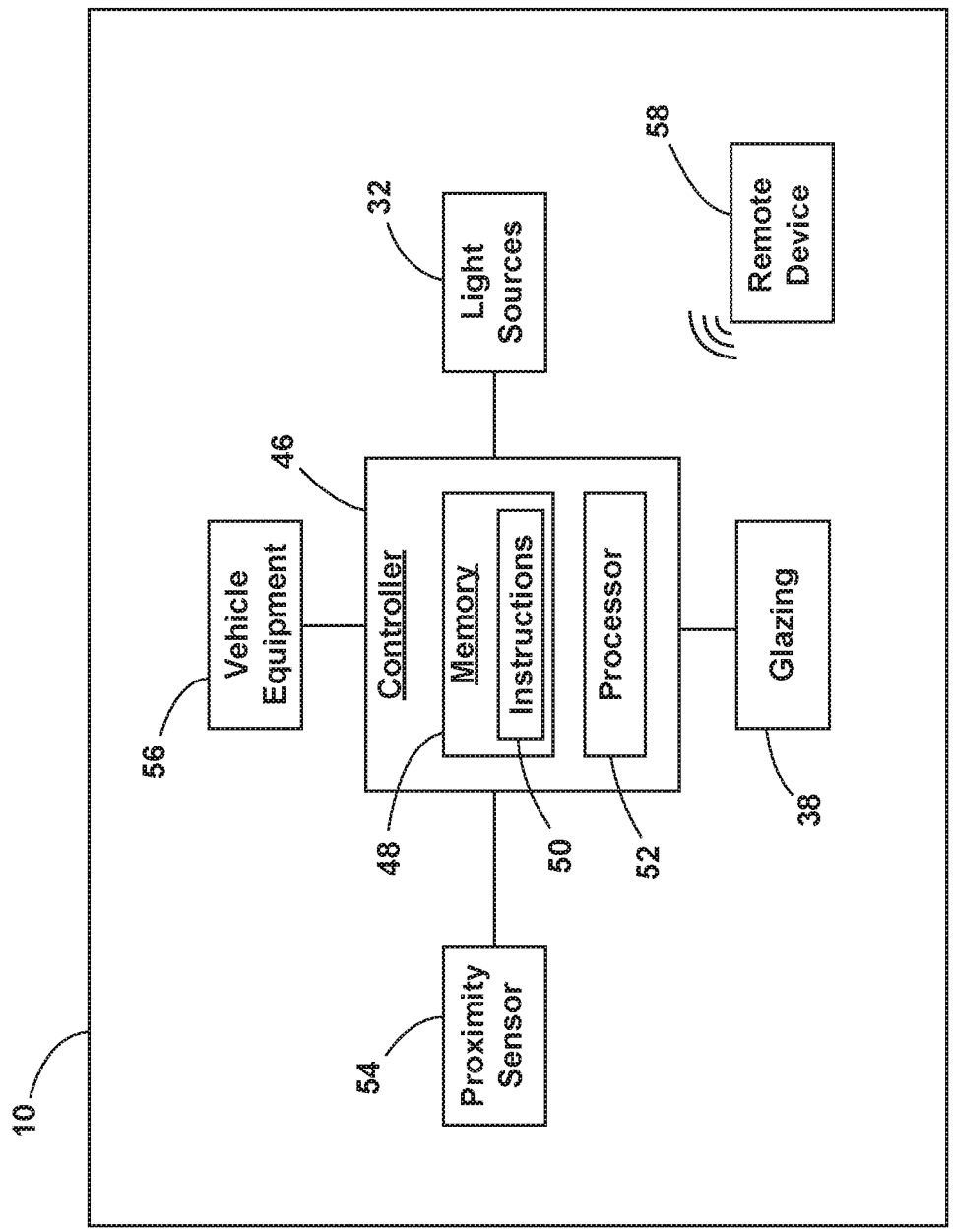
FIG. 4 is a block diagram of the vehicle window assembly.

With reference to FIG. 4, the light sources 32 and the glazing 38 are coupled to a controller 46 that may be variously located in the vehicle. The controller 46 includes a memory 48 storing instructions 50 thereon and a processor 52 for executing the instructions. In operation, the instructions 50 control the light sources 32 and the glazing 38 based on user-supplied input. For example, the user-supplied input may include a touch event registered by a proximity sensor 54 (e.g., a capacitive sensor) coupled to the inner layer 16 and in communication with the controller 46. As depicted in FIGS. 2 and 3, the proximity sensor 54 is located in zone 14a and is generally aligned with the light-producing assembly 30 from the vantage point of a vehicle occupant positioned therebelow. It is contemplated that the proximity sensor 54 is light transmissive and may include one or more markings (not shown) to notify a user of its whereabouts.

In one exemplary use scenario, the user performs a first touch event on the proximity sensor 54, and in response, the controller 46 activates the light sources 32 and allows voltage to be applied to the conductive materials 42, 44. When voltage is applied to the conductive materials 42, 44, the electric filed formed therebetween causes the liquid crystal droplets 40 to become aligned. As a result, as shown in FIG. 2, light emitted from the light sources 32 is collimated by the optical film 34 and passes through the glazing 38 with minimal scattering, or in other words, the glazing 38 operates in a transparent state. In such an instance, the glazing 38 is operated in an ON state to enable the light-producing assembly 30 to transmit collimated light thereby functioning as a map light.

If the user performs a second touch event on the proximity sensor 54, the controller 46 responds by keeping the light sources 32 activated and preventing voltage from being applied to the conductive materials 42, 44. When voltage ceases to be applied to the conductive materials 42, 44, the liquid crystal droplets 40 lose alignment. As a result, as shown in FIG. 3, light emitted from the light sources 32 is collimated by the optical film 34 and is scattered by the liquid crystal droplets 40, or in other words, the glazing 38 operates in a semi-transparent state. In such an instance, the glazing 38 is operated in an OFF state to enable the light-producing assembly 30 to disperse light thereby functioning as a dome light. It is contemplated that the light sources 32 may be configured to emit different colored light based on the glazing 38 operating in the ON or OFF state. That is, the light sources 32 may emit light of a first color if the glazing 38 is in the ON state, and a second color, visually different from the first color, if the glazing 38 is in the OFF state.

If the user performs a third touch event on the proximity sensor 54, the controller 46 responds by deactivating the light sources 32 and operating the glazing 38 in the OFF state. As an additional feature, it is contemplated that the light-producing assembly 30 may extend a substantial portion of the interlayer 20 and the glazing 38 may be operated in the ON state while the light sources 32 are deactivated to provide shade from sunlight.

Accordingly, through a number of touch events, the user may selectively operate the light-producing assembly 30 to function as map light and a dome light. Although the exemplary scenario described above contemplates operating the light-producing assembly 30 as a map light and a dome light in response to a first touch event and a second touch event, respectively, it will be appreciated that the first and second touch events may alternatively lead to the light-producing assembly 30 operating as a dome light and a map light, respectively. Furthermore, while the proximity sensor 54 has been described as one means for providing user-supplied input, it will be understood that the controller 46 may operate the light sources 32 and the glazing 38 in response to other user-supplied input or vehicle-supplied input. For example, as shown in FIG. 4, it is contemplated that the controller 46 may operate the light sources 32 and the glazing 38 based on input received from other vehicle equipment 56 or a remote device 58 such as a smartphone. Thus, in embodiments employing the remote device 58, it will be appreciated that the controller 46 may be configured to wirelessly communicate with the remote device 58 via any suitable wireless communication protocol such as, but not limited to, Bluetooth.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle window assembly comprising:
an inner layer in communication with a vehicle cabin, an outer layer in communication with an outside vehicle environment, and an interlayer therebetween; and
a light-producing assembly disposed in the interlayer and including:

light sources oriented toward the inner layer and generally away from the outer layer such that the light sources are configured to emit light toward the inner layer and generally away from the outer layer;

an optical film having a light refractive microstructure that is in contact with the light sources, the optical film being configured to collimate light emitted by the light sources; and a variable-transparency switchable glazing configured to vary the transmittance of the light emitted from the light sources and collimated by the optical film based on user-supplied input between a first state, wherein the variable-transparency switchable glazing is configured to transmit the collimated light received from the optical film, and a second state, wherein the variable-transparency switchable glazing is configured to scatter the collimated light received from the optical film.

2. A vehicle window assembly of claim 1, wherein the interlayer comprises a first tinted layer coupled to the inner layer and a second tinted layer coupled to the outer layer, and wherein the light-producing assembly is disposed between the first and second tinted layers.

3. A vehicle window assembly of claim 1, wherein the light sources comprise micro light-emitting diodes.

4. The vehicle window assembly of claim 1, wherein the variable-transparency switchable glazing comprises a polymer dispersed liquid crystal device and is in contact with or is spaced apart from the optical film.

5. The vehicle window assembly of claim 1, wherein based on the user-supplied input, the variable-transparency switchable glazing is operated to transmit or scatter collimated light received from the optical film.

6. The vehicle window assembly of claim 5, wherein the light-producing assembly functions as a map light when the variable-transparency switchable glazing is operated to transmit collimated light and a dome light when the variable-transparency switchable glazing is operated to scatter collimated light.

7. The vehicle window assembly of claim 5, further comprising a proximity sensor coupled to the inner layer and disposed to align with the light producing assembly from the vantage point of a vehicle occupant positioned therebelow.

8. The vehicle window assembly of claim 7, wherein the user-supplied input comprises one or more touch events registered by the capacitive sensor.

9. The vehicle window assembly of claim 8, further comprising a controller coupled to the capacitive sensor, the light sources, and the variable-transparency switchable glazing, wherein the controller includes instructions for controlling the light sources and the variable-transparency switchable glazing based on the user-supplied input received via the capacitive sensor.

10. The vehicle window assembly of claim 1, configured as a sunroof or a moonroof.

11. A vehicle window assembly comprising:

a vehicle window dividing a vehicle cabin from an outside vehicle environment and having plurality of zones configured to provide illumination to the vehicle cabin; and a light-producing assembly comprising light sources oriented to emit light toward the vehicle cabin and generally away from the outside vehicle environment proximate to the vehicle window, an optical film having a light refractive microstructure that is in contact with the light sources and is configured to collimate light emitted by the light sources, such that the light emitted by the light sources toward the vehicle cabin is concentrated to be transmitted toward the vehicle cabin and generally away from the outside vehicle environment proximate to the vehicle window, and a variable-transparency switchable glazing configured to transmit or scatter collimated light received from the optical film; and a proximity sensor integrated with the vehicle window and located in each zone, wherein the light-producing assembly is operable to illuminate as a map light or a dome light based on one or more touch events registered by the proximity sensor.

12. The vehicle window assembly of claim 11, wherein the light-producing assembly is disposed in an interlayer of the vehicle window.

13. The vehicle window assembly of claim 12, wherein a first touch event results in the variable-transparency switchable glazing operating to one of transmit and scatter collimated light received from the optical film, and wherein a second touch event results in the variable-transparency switchable glazing operating to the other of transmit and scatter collimated light received from the optical film.

14. The vehicle window assembly of claim 13, wherein a third touch event results in deactivation of the light-producing assembly.

15. The vehicle window assembly of claim 1, wherein the light sources are oriented toward a surface of the inner layer that is in communication with the vehicle cabin and generally away from a surface of the outer layer that is in communication with the outside vehicle environment, such that the light sources are configured to emit light toward the surface of the inner layer and generally away from the surface of the outer layer.

* * * * *